United States Patent [19]

Chieng et al.

[11] Patent Number: 5,158,758
[45] Date of Patent: Oct. 27, 1992

[54] PRODUCTION OF SILICA HAVING HIGH SPECIFIC SURFACE AREA

[75] Inventors: Paul C. Chieng; Deborah J. Brame, both of St. Louis, Mo.; Alexander H. T. Chu, Buffalo Grove, Ill.

[73] Assignee: International Minerals & Chemical Corp., Northbrook, Ill.

[21] Appl. No.: 342,547

[22] Filed: Apr. 24, 1989

[51] Int. Cl.$^5$ ............................................. C01B 33/14
[52] U.S. Cl. ........................................ 423/338; 423/336
[58] Field of Search ............... 423/336, 338, 341, 481; 65/18.1

[56] References Cited

U.S. PATENT DOCUMENTS

| | | | |
|---|---|---|---|
| 1,451,399 | 4/1923 | Low | 423/336 |
| 1,539,342 | 5/1925 | Williams | 423/338 |
| 2,269,059 | 1/1942 | McLachlan | 501/133 |
| 2,386,337 | 10/1945 | Moyer | 423/335 |
| 2,715,060 | 8/1955 | Barry | 423/336 |
| 2,990,249 | 6/1961 | Wagner | 423/336 |
| 3,236,594 | 2/1966 | Ray | 423/336 |
| 3,494,875 | 2/1970 | Page | 502/243 |
| 4,301,034 | 11/1981 | McDaniel | 423/338 |
| 4,339,559 | 7/1982 | McDaniel | 423/338 |
| 4,504,595 | 3/1985 | Jacques | 423/338 |
| 4,683,128 | 7/1987 | Orii et al. | 423/335 |
| 4,826,521 | 5/1989 | Wiechmann et al. | 423/338 |
| 4,840,653 | 6/1989 | Rabinovich | 423/338 |

FOREIGN PATENT DOCUMENTS

| | | | |
|---|---|---|---|
| 50-53298 | 5/1975 | Japan | 423/338 |
| 51-48797 | 4/1976 | Japan | 423/338 |

OTHER PUBLICATIONS

"Silicon Compounds (Esthers and Esters)", Encyclopedia of Chemical Technology 20:912-921.
Halasz, "New Stationary Phase for Chromatography", Angew. Chem. Internat. Edit. 8:453-454 (1969).
Colin, "Introduction to Reversed-Phase High-Performance Liquid Chromatography", J. Chromatog. 141:289-312 (1977).
Paanakker, "Some Aspects of the Influence of the Mobile Phase Composition in Normal-Phase Liquid-Solid Chromatography, with Special Attention to the Role of Water Present in Binary Organic Mixtures", J. Chromatog. 149:111-126 (1978).
Huber, "Adjustment of the Capacity Factor by Means of the Specific Surface Area of the Adsorbent for Optimal Separation in Liquid-Solid Chromatography", J. Chromatog. 149:127-141 (1978).
Colin, "Comparison of Some Packings for Reversed-Phase High-Performance Liquid-Solid Chromatography, I.", J. Chromatog. 149:169-197 (1978).
Larson, "Determination of the Reactive Surface Area of Silica", Chromatographia 16:204-206 (1982).
Rabinovich, "Preparation of High-Silica Glasses from Colloidal Gels: I, Preparation for Sintering and Properties of Sintered Glasses", J. Am. Ceramic Soc. 66:683-688 (1983).
Verzele, "Quality Criteria and Structure of Silica Gel Column Packing Material", J. Chromatog. 329:351-357 (1985).

(List continued on next page.)

*Primary Examiner*—Olik Chaudhuri
*Assistant Examiner*—Ken Horton
*Attorney, Agent, or Firm*—Wendall Ray Guffey; Thomas L. Farquer; William J. Fisher

[57] ABSTRACT

A method for production of high specific surface area silica gel by hydrolysis of silicon tetrahalide, wherein a solution of silicon tetrahalide in a non-reactive solvent such as alcohol is mixed with water to produce silica gel having a high surface area and narrow pore diameter distribution especially suited for use as normal phase packing material in high performance chromatography columns. The water contains fluoride ions if the halide is chloride. Reverse phase packing material can be prepared by reacting the normal phase silica gel with organochlorosilanes to prepare bonded reverse phase material for use in high performance liquid chromatography systems.

20 Claims, 8 Drawing Sheets

OTHER PUBLICATIONS

Martin, "An Apparatus for Slurry-Packing Preparative LC Columns", Reprinted from Liquid Chromatography, Jun. 1985.

Rabinovich, "Fluorine in Silica Gels", Mat. Res. Symp. Proc. 73:251-259 (1986).

Mauss, "Thermal Treatment of Silica and its Influence on Chromatographic Selectivity", J. Chromatog. 371:235-242 (1986).

Kohler, "Improved Silica-Based Column Packings for High-Performance Liquid Chromatography", J. Chromatog. 385:125-150 (1987).

Colin, "Comparison of Some Packings for Reversed-Phase High-Performance Liquid-Solid Chromatography, II", J. Chromatog. 158:183-205 (1978).

PRODUCTION OF SILICA HAVING HIGH SPECIFIC SURFACE AREA

BACKGROUND OF THE INVENTION

1. Field of The Invention

This invention relates to a method of producing high specific surface area silica ($SiO_2$) of uniform porosity suitable for liquid chromatography uses by hydrolysis of silicon tetrafluoride ($SiF_4$) or silicon tetrachloride ($SiCl_4$).

2. Description of Related Art

Silica gel is widely used in chromatographic separations. Silica gel having high specific surface area and uniform porosity is especially useful in chromatographic techniques. Because impurities interfere with chromatographic separations, suitable silica gel desirably is essentially pure. Suitable silica must also have high strength so that it is not crushed under high pressures utilized for high performance liquid chromatographic separations.

Silica gel used in chromatographic separations must have uniform properties, not only within one chromatography column, but also from column to column, to ensure reproducibility of results. Thus, it is not sufficient to have uniform properties merely within a single batch of silica gel. Properties of silica gel must be uniform and predictable from batch to batch. The cost must also be reasonable.

High specific surface area silica gel produced using known techniques is unsatisfactory in one or more of these aspects. For example, silica gel produced by hydrolysis of tetraethoxysilane (TEOS) is expensive because TEOS is a relatively expensive reactant. Acidulation of sodium silicate does not involve expensive starting materials, but produces a silica gel product which contains large quantities of contaminants such as unreacted silicates. The level of impurities is sufficient to make the silica gel unsuitable for use in chromatographic separations.

U.S. Pat. No. 3,236,594 discloses a process for making finely divided silica from silicon tetrafluoride. The process is operated at ordinary temperature and fluorine is recovered as an inorganic fluoride. Silicon tetrafluoride is absorbed into a lower aliphatic alcohol to form a solution of a stable complex. This solution is reacted with inorganic base chosen from the group consisting of ammonium hydroxide and the oxides and hydroxides of alkali metals and alkaline earth metals and at least a stoichiometric amount of water to hydrolyze the silicon tetrafluoride. Then, silica is separated from the mixture containing metal fluoride or ammonium fluoride. However, silica gel produced by this method is unsatisfactorily powdery and is not suitable for use in high performance liquid chromatography columns.

Liquid chromatography columns using silica gel typically are either normal phase or reversed phase. Normal phase liquid chromatographic separations utilize interactions between polar silanol moieties on the surface of the column packing and the composition being separated. In reversed phase liquid chromatography, a nonpolar stationary phase is bonded to the silanol group on the surface of the silica gel. This stationary phase, in combination with terminal groups ("endcaps") reacted onto the stationary phase, interact with the composition being separated.

The properties of silica gel suitable for normal phase use, described above, are similarly desirable for silica gel used as substrate for reverse phase liquid chromatography columns. However, additional characteristics are necessary for reverse phase liquid chromatography column packing. To ensure reproducibility of result, the stationary phase should be normally distributed, i.e., distributed in a monolayer, over the surface of the silica gel.

Various stationary phases have been bonded on the surface of silica gel particles. Octadecylchlorosilanes are often used as the stationary phase. Organochlorosilanes of other carbon numbers (e.g., $C_2$, $C_4$, and $C_8$) also are used for surface bonding. Use of monochlorosilane compounds typically ensures monolayer distribution of the stationary phase over the silica gel substrate.

The consistency of quality required of silica gel used in chromatographic columns requires control over product properties. It is difficult to control product characteristics, however, in known processes requiring gelation of silicon tetrachloride in which a large stoichiometric excess of water is used. Further, these processes require long gelling periods, and the specific surface area of silica thus produced is too high for chromatographic uses.

It is an object of this invention to provide a method for producing high specific surface area silica gel by hydrolysis of silicon tetrahalide, i.e., silicon tetrafluoride or silicon tetrachloride.

It is another object of the invention to provide a method for obtaining silica gel having a selected specific surface area and narrow pore diameter range.

It is a further object of this invention to provide a high specific surface area silica gel suitable for use in high performance liquid chromatography columns.

It is yet another object of this invention to provide a method of preparing material which can be bonded to prepare packing material for reversed phase high performance liquid chromatography columns.

SUMMARY OF THE INVENTION

In accordance with these and other objects, this invention relates to a method for production of high specific surface area silica of a uniform porosity gel by hydrolysis of silicon tetrahalide. According to the process, a solution of silicon tetrahalide in a non-aqueous solvent such as alcohol is mixed with water to produce silica gel having a very high surface area especially suited for use as normal phase packing material in high performance chromatography columns. In the case of silicon tetrachloride, fluoride ion also is present in the water. Reverse phase packing material can be prepared by reacting the normal phase silica gel with organochlorosilanes to prepare bonded reverse phase material for use in high performance liquid chromotagraphy systems.

DETAILS OF THE INVENTION

Figure 1:
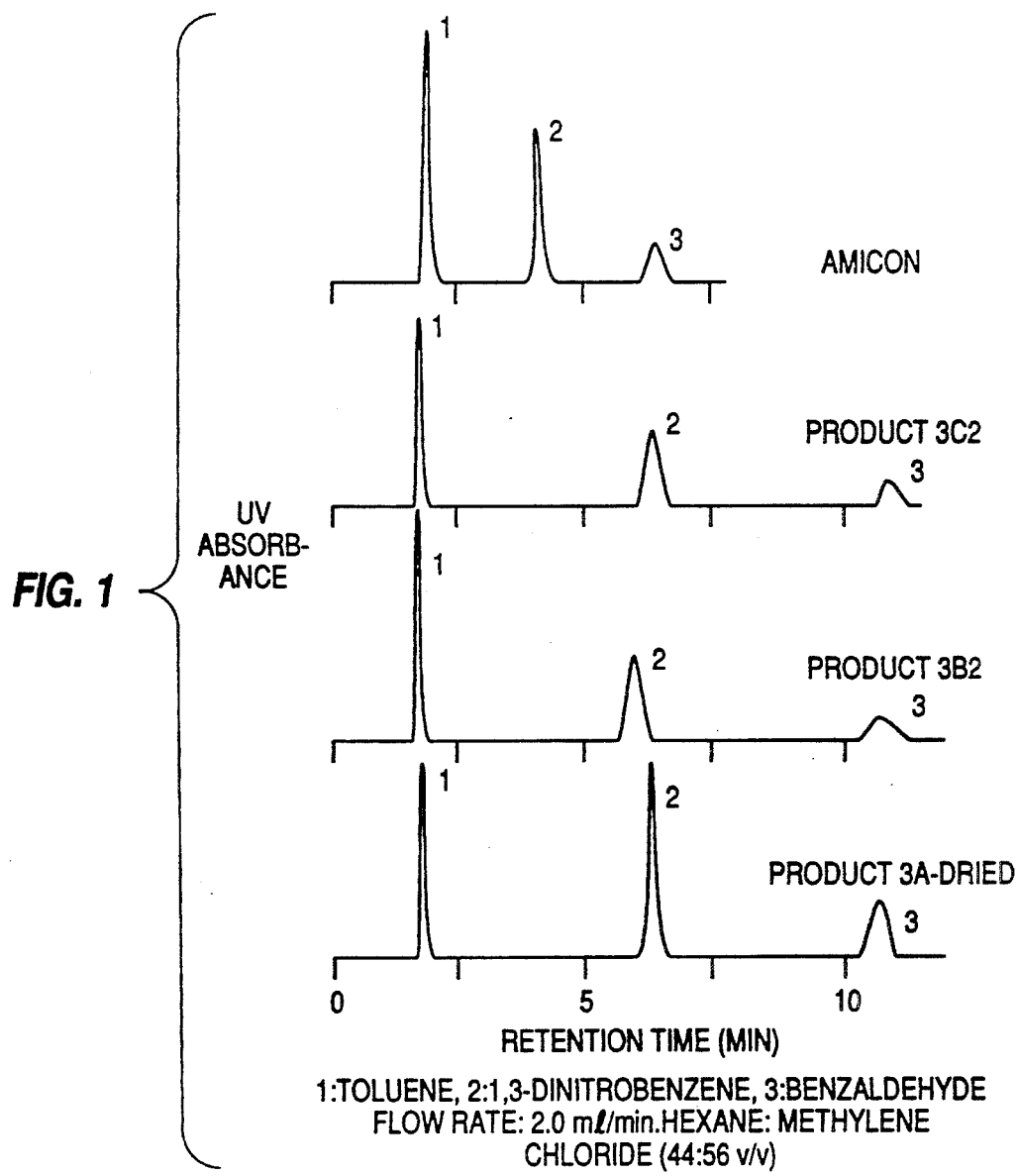
FIG. 1 illustrates the separation performance of silica gel columns.

This invention is based on the discovery that silica gel produced by hydrolysis of silicon tetrahalide absorbed in a non-aqueous solvent such as alcohol has high specific surface area and a uniform porosity. Silica gels prepared by controlled hydrolysis have properties suitable for use as high performance liquid chromatography column packing. Reverse phase high performance liquid chromatography column packing material can be prepared by reacting this high surface area silica gel with organochlorosilanes and other bondable constituents.

Silica gel produced in accordance with the method of this invention can have a preselected specific surface area and corresponding average pore diameter within a wide range by manipulating processing conditions. As used herein, the phrases "high surface area" and "high specific surface area" mean a specific surface area at least about 100 m$^2$/g, preferably at least about 150 m$^2$/g. The range of specific surface areas typically achievable when using the method of this invention is from about 200 to about 600 m$^2$/g and the corresponding average pore diameters range from about 50 to about 200 Angstroms.

Silica prepared in accordance with the method of the invention will have a narrow distribution of pore diameters around the selected value. Typically, the standard deviation in pore diameter is less than about 25 percent of pore size, preferably is less than about 15 percent of pore size and most preferably is between about 5 and 10 percent of the size, i.e., at an average pore diameter of 75 Angstroms, the standard deviation is between about 3.75 and 7.5 Angstroms. The conditions under which the silica gel is prepared determine the specific surface area and average pore diameter of the gel product.

Silica gel is the reaction product of water and silicon tetrafluoride, in accordance with the following reaction equation:

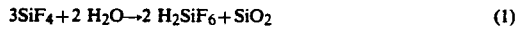

$$3SiF_4 + 2 H_2O \rightarrow 2 H_2SiF_6 + SiO_2 \qquad (1)$$

The reaction of silicon tetrachloride yields silica and hydrogen chloride, as follows:

$$SiCl_4 + 2 H_2O \rightarrow SiO_2 + 4 HCl \qquad (2)$$

Silica gel formed by these exothermic reactions is washed, ground, and classified by particle size. It then can be used as normal phase liquid chromatography column packing or can be modified by reaction with organochlorosilanes to produce reversed phase packing.

Hydrolysis of silicon tetrafluoride in accordance with the invention yields 1 mol of silica for every 3 mols of silicon tetrafluoride. It has been discovered that a minor amount of ammonium hydroxide (up to about 1 wt percent NH$_4$OH) may be added to the water to increase the rate of gelation and to produce a favorable effect on the acidity of gel made from silicon tetrafluoride.

Hydrolysis of silicon tetrachloride in accordance with the invention is much more efficient than is preparation of gel from silicon tetrafluoride, as 100 percent of the silicon is available to form silica. However, the period required to form a gel by reaction with water is quite long. It has been discovered that addition of fluorine ions to the water used to hydrolyze silicon tetrachloride not only accelerates gelation but also affords a measure of control over the properties of the gel product which cannot be attained by known methods of hydrolyzing silicon tetrachloride. Further, it has been discovered that the specific surface area of gel produced by hydrolysis of silicon tetrachloride which is aged for about 4 hours after gel formation is affected by the temperature at which the gel is aged.

Silicon tetrafluoride may be obtained from many sources. Typically, silicon tetrafluoride used in the present invention is recovered as a by-product of the wet process acid (WPA) method for obtaining phosphoric acid. However, silicon tetrafluoride from any source is suitable for use in the method of the invention if it is reasonably pure. For purposes of this invention, the silicon tetrafluoride should have substantially no impurities which would adversely affect the purity and quality of the silica product.

Similarly, silicon tetrachloride essentially free of impurities which would adversely affect the purity and quality of the silica product may be used in the method of the invention. Such material may be obtained from divers sources.

The concentration of silicon tetrahalide in the solvent can range up to the concentration at which silicon tetrahalide is saturated in the solvent. The differences between the saturation concentrations of silicon tetrafluoride and of silicon tetrachloride in solvents used in the method of this invention are not significant for the purposes of the invention. It has been discovered that specific surface area of silica gel is decreased by excessively high silicon tetrahalide concentration in the solvent. Therefore, although silicon tetrahalide concentration in solvent may range beyond 40 wt. percent, preferred silicon tetrahalide concentrations are less than the saturation concentration and in the range about 5 to 40 wt. percent, more preferably between about 8 and 30 wt. percent, and most preferably between about 10 and 20 wt. percent, based on the weight of the solvent.

Suitable solvents are those able to act as solute for silicon tetrahalide without forming silica gel. Further, the solvent is preferably sufficiently soluble with water so that at least a stoichiometric quantity of water will be available for reaction with the silicon tetrahalide absorbed therein. The solvent should also be fluid at room temperature (i.e., less than about 30° C.).

Suitable solvents for silicon tetrahalide include selected alcohols. Both saturated and unsaturated aliphatic alcohols are preferred in the subject invention. Low molecular weight alcohols are especially preferred because the solubility of the alcohol in water increases as the molecular weight decreases. Thus, the C$_1$–C$_5$ aliphatic alcohols, including alicyclic alcohols such as cyclopentanol, are preferred, while the C$_1$–C$_4$ aliphatic alcohols are most preferred, and the C$_1$–C$_3$ aliphatic alcohols are most preferred. The most preferred alcohols are completely miscible with water. Normally, alcohols having an aromatic moiety, such as phenols, are typically insufficiently soluble in water or are not fluid at about 30° C. to be useful as a solvent.

Under certain conditions, alkoxysilicon compounds may form when silicon tetrahalide is added to the solvent. For example, addition of silicon tetrachloride to methanol may result in formation of a volatile component such as hydrogen chloride and produce methoxysilicon-containing compounds in accordance with the reaction

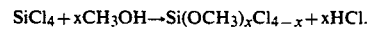

$$SiCl_4 + xCH_3OH \rightarrow Si(OCH_3)_xCl_{4-x} + xHCl.$$

The presence of these compounds does not interfere with the subsequent silica gel formation. The exothermic nature of the dissolution of silicon tetrachloride in methanol requires not only that silicon tetrachloride be mixed into methanol, but also that the rate at which silicon tetrachloride is added be controlled to prevent overheating of the solution. In contrast, one wishing to produce tetramethoxysilane, i.e., $Si(OCH_3)_4$, in a batch process would add the methanol to the silicon tetrachloride.

Solvent should be essentially free of impurities and contaminants which adversely affect the product silica gel. The solution of silicon tetrahalide in solvent also should be essentially free of trace impurities such as metals which, if incorporated into the silica gel structure, affect the surface properties of the silica gel particles. Similarly, the solvent should be free of contaminants which hydrolyze or otherwise react with silicon tetrahalide.

Thus-prepared silicon tetrahalide solution then is rapidly mixed with water, which contains fluoride ion if the halide is chloride, and is agitated to ensure thorough mixing. The water must have essentially no impurities which are proscribed from the solvent, as described above. For example, water which has been de-ionized and filtered, then distilled is suitable for use in this invention. Thus-treated water may have an electrical resistance of about 1 mega-ohm.

After the components are well mixed to ensure intimate contact between the water and the silicon tetrahalide, the resulting gelling medium (i.e., the mixture of water and silicon tetrahalide-containing solution) is allowed to stand without further agitation. The period required for gel formation varies with reaction conditions, and typically is less than about 24 hours. It has been discovered that the specific surface area properties of dried gel product can be further influenced by aging gel produced by hydrolysis of silicon tetrahalide for about four hours, as described below.

The identity of the silicon tetrahalide determines the reactants used, the manner in which the gel is produced, and whether postgellatin treatment is required. Preparation of the silicon tetrahalide solution differs significantly. Silicon tetrafluoride is a gas at ambient conditions, and is sparged or bubbled into the solvent until a predetermined concentration is achieved. Because the heat of dissolution of silicon tetrafluoride in solvents described herein is small, the temperature of the solution is essentially the same as the starting temperature of the solvent. Silicon tetrachloride is liquid at ambient temperature, and is therefore easier to handle than gaseous silicon tetrafluoride. However, because the heat of dissolution of silicon tetrachloride in solvent is much larger than that of silicon tetrafluoride, care must be exercised to ensure that the solution doesn't boil. Further, HCl is evolved from the solution. Thus, silicon tetrachloride is added slowly to solvent until the desired concentration is reached. Preferably, the solution temperature does not exceed about 50° C. The solution may be cooled, if necessary.

When silicon tetrafluoride is utilized, the reactants typically are at or below ambient temperature before mixing. Any temperature at which all reactants are liquid is acceptable. Hydrolysis of silicon tetrafluoride is an exothermic reaction. If the gelling medium is not externally cooled during the hydrolysis reaction, the temperature will rise as the reaction proceeds. Preferably, the gelling medium is not allowed to boil.

External cooling can be utilized, but typically is not necessary. Reactant solutions can be cooled conveniently before mixture. Although the temperature increase resulting from the heat of reaction of silicon tetrafluoride will vary with the quantity of gelling medium in which the heat is absorbed, seldom will the temperature exceed 50° C. in accordance with the practice of this invention. Therefore, cooling generally is not needed to remove the exothermic heat of reaction.

The time required to form the gel depends upon reaction conditions and varies from a few seconds to about 24 hours.

At least a stoichiometric quantity of water preferably is utilized to hydrolyze the silicon tetrafluoride. Utilizing less than a stoichiometric quantity of water, i.e., using less than 2 mols of water per 3 mols of silicon tetrafluoride, precludes recovery of a theoretically expected quantity of silicon as silica, and thus is inefficient.

It also has been discovered that specific surface area of silica product is affected by the quantity of water present. Increasing the quantity of water beyond the stoichiometric minimum increases the specific surface area of the gel. Preferably, a stoichiometric excess of water is used to maintain a water to silicon tetrafluoride mass ratio of at least about 2:1, more preferably between about 2:1 and 20:1, and most preferably between about 4:1 and 10:1. Additional water also serves as a heat sink for the exothermic heat of reaction.

Although use of ammonia as an adjuvant during gelation is not required in the practice of this invention, use of a minor amount of ammonia when hydrolyzing silicon tetrafluoride has been discovered to have a salutary effect on the rate of gelation and the acidity of the gel product. Preferably, the amount of ammonium hydroxide does not exceed about 1.0 wt percent based on the weight of the water, more preferably does not exceed about 0.5 wt percent, and most preferably does not exceed about 0.3 wt percent. It has been discovered that silica gel product obtained with more than about 1 wt. percent ammonium hydroxide in the water is weak and powdery. Thus, such product is not suitable for use in high performance liquid chromatography columns. Lack of strength allows silica gel particles to be crushed under pressure. Due to the powdery nature and poor strength of such silica, fines are generated during loading and use. These fines tend to block the liquid chromatography column, impeding flow and causing pressure to increase while reducing the efficiency of the column.

When silicon tetrachloride is hydrolyzed in accordance with the method of the invention, fluoride ions are present in the water when the water and the silicon tetrachloride-containing solvent are mixed. Fluoride ion may be derived from any source which does not contribute deleterious impurities to the water. Thus, the aqueous solution of fluoride may be obtained by dissolving pure ammonium fluoride crystals in pure water or from hydrofluoric acid solution.

The concentration of fluoride ion in water is up to about 6 wt. percent, and preferably is between about 1 and 6 wt percent. It has been discovered that the ratio of fluoride ion to silicon tetrachloride has a significant effect on the specific surface area and yield of silica product. Typically, yield declines as this ratio is increased, except at low (up to about 1 wt percent) fluoride concentration in water, where the relationship is reversed. Specific surface area typically moves through a minimum as the ratio is increased. Skilled practitioners will be able, with the guidance provided herein, to determine these relationships with specificity.

Hydrolysis of silicon tetrachloride also is an exothermic reaction which is allowed to proceed without cooling at a temperature below the boiling point of the gelling medium. Reactants may be cooled before being combined.

The quantity of water should at least satisfy the stoichiometric requirement, i.e., 2 mols of water per mol of silicon tetrahalide. Preferably, a large stoichiometric excess of water is utilized, i.e., between about 5 and 60 mols of water per mol of silicon tetrachloride, more preferably between about 5 and 30 mols of water per mol of silicon tetrachloride, and most preferably between about 10 and 30 mols of water per mol of silicon tetrachloride.

The time required to complete the reaction depends upon the reaction conditions and can range from a few seconds to hours. In the case of silicon tetrachloride, the reaction rate is increased by increased quantities of fluoride ion. Those skilled in the art will recognize that the conditions which adversely affect specific surface area, as outlined above, such as increasing silicon tetrahalide concentration in the solvent or decreasing the water/silicon tetrahalide ratio, are those conditions which result in a shorter reaction time.

The gel formed by hydrolysis of silicon tetrachloride is aged for about 4 hours at a temperature between the freezing and boiling temperatures, preferably between about 20° and 80° C. It has been discovered that the specific surface area of dried gel thus treated decreases with increasing aging temperature.

The silica gel is separated from the remainder of the reaction mixture by, e.g., suction filtration or centrifugation, then is washed until the pH of the wash water is at least about 3 to remove fluorides, including HF, $H_2SiF_6$, and ammonium fluoride, which may be present in the gel. Washing techniques are well known to those skilled in the art. The water used in the wash medium should have the same purity as the water used to hydrolyze the silicon tetrahalide. Typically, the silica gel is soaked in deionized water for about 2 hours, after which the gel is separated by decantation or centrifugation. The pH of the water typically is measured after the gel has soaked in the washing medium for at least about 2 hours. After pH measurement, the washing medium is decanted and fresh wash medium added. The soak/separation cycle is repeated a plurality of times until the pH of the waste wash medium is above about 3, preferably above about 5. It has been discovered that the specific surface area of the silica is increased when the pH of the waste wash medium, and thus of the silica itself, is at least above about 3, and preferably is above about 5, before the gel is further processed. The pH of the gel is determined in 2% aqueous suspension.

The wash medium can be pure water, or can include adjuvants which aid in neutralizing the acidity of the gel. For example, a minor amount of ammonium hydroxide is a useful adjuvant. Generally, the concentration of ammonium hydroxide in the wash medium is less than about 0.010 wt. percent, preferably less than about 0.005 wt. percent.

High specific surface area silica gel thus washed then is dried, ground, and classified according to particle size. Before grinding, the specific surface area and pore size can be determined. Methods for detemining these characteristics are well known in the art. For example, specific surface area can be determined by single point or multiple point BET. Similarly, pore size distributions can be determined by capillary condensation and multilayer adsorption/desorption of nitrogen, or an automatic porosimeter.

Silica gel prepared in accordance with the method of this invention is dried in air by a method known in the art. During this time, the temperature typically does not exceed about 200° C., and preferably does not exceed about 150° C. The dried silica gel typically has a moisture content less than about 5 wt. percent, preferably less than about 3 wt. percent, based on the weight of the silica gel.

Characteristics of the silica gel may be determined before or after the gel is ground and classified to yield a predetermined particle size. Typical particle sizes used for liquid chromatography column packing include 5 microns and 10 microns. Preferably, particles less than 2 microns are removed because such small particles cause excessively high pressure drop in packed columns. Any particle size reduction method which does not introduce unacceptable quantities of impurities into the gel particles can be utilized to achieve the selected particle size. Such methods are known to skilled practitioners.

Particles to be used in chromatographic applications, and for other water-sensitive uses, should be further dried to eliminate essentially all water molecules associated with the surface of the gel particle. This additional drying step is carried out by methods known in the art, such as heating gel particles to between about 120° C. and 200° C. in a vacuum of 28 inches of mercury for about 24 hours.

Failure to properly dry the silica gel will result in a gel product which is not suitable for chromatographic separations. Water on the surface of the gel particle affects the form of the silanol group on the particle. The surface of silica gel may comprise individual silanol groups (SiOH), hydrogen bonded (vicinal) silanol groups ((SiOH)(HOSi)), and geminal silanol groups (Si(OH)$_2$). The presence of water facilitates changes in form. Although all forms are useful in chromatography, it is more difficult to maintain consistent results when the form of silanol is not consistent. Therefore, careful drying is important.

The method of the invention yields silica gel which is more acidic (determined in 2% aqueous suspension) than most commercially available silica gels. Acidic silica is thought to be more efficient for chromatographically separating neutral and acidic solutes than basic, nitrogen-containing solutes. Acidic gels may cause variable retention times and excessive peak tailing for basic compounds for reasons known to those skilled in the art.

Dilute hydrofluoric acid wash typically is used to condition silica before bonding stationary phases thereto. Such conditioning improves separation efficiency and sample recovery because the surface silanols are fully hydroxylated, i.e., form individual silanol groups. Such a wash is not necessary for gel made in accordance with this invention, however, because individual silanol groups exist when silica is produced in accordance with the method of the invention. The acidity of the gel is believed to be the result of high specific silanol group concentration. Further, the gel is especially suited for use as reverse phase chromatography column packing because organochlorosilanes are bonded preferentially to sites having individual silanol groups.

Organochlorosilane may be bonded as a stationary phase to dried acid-treated silica gel by methods known in the art, such as refluxing organochlorosilane with the silica gel. Catalyst such as pyridine and other organic bases may also be used. The monochloro forms of organochlorosilanes are preferred because they form a monolayer stationary phase. The monofunctionality of the molecule, which results from the single chlorine moiety, precludes reactions which would form a polymeric, multi-layered stationary phase. To ensure improved separation reproducibility by minimizing undesired interaction between residual silanol and the mobile phase, the stationary phase is endcapped with a constituent which makes the stationary phase essentially unreactive. Chlorotrimethylsilane is a preferred endcap constituent. The silica gel product thus prepared is ready for use as column packing for reverse phase liquid chromatography.

The following examples illustrate various aspects of this invention, but are in no way intended to narrow the scope of the invention. The scope of the invention is limited only by the scope of the appended claims.

EXAMPLES

Unless otherwise identified, reagents and solvents utilized in the following examples were purchased from commercial sources and were used without additional purification:
Silicon tetrafluoride (Matheson, 99.99% min.)
Silicon tetrachloride (Alfa or Aldrich)
Ethanol (Fisher, 100%)
Methanol (Fisher, 99.9%)
Ammonium Hydroxide (Fisher, 28-30%)
Ammonium Fluoride
Hydrogen Fluoride
Deionized water-processed in a Barnstead Nanopure II Cartridge System and distilled (MP-6 Angstrom Megapure System).

EXAMPLE 1

Silica gel was prepared by hydrolysis of silicon tetrafluoride in accordance with the method of the invention to study the effect of varying reactant concentrations on specific surface area. The data are summarized in Table 1.

Silicon tetrafluoride was bubbled into anhydrous ethanol until a preselected concentration was achieved. In an ice water bath, a predetermined quantity of water was rapidly mixed with the silicon tetrafluoride/ethanol solution with brief agitation and then allowed to stand. The temperature of the mixture increased between about 5 and 25° C., depending upon reaction conditions. The time required for gel formation, also dependent upon reaction conditions, varied from seconds to hours.

The concentration of silicon tetrafluoride in ethanol was 16 wt. percent in all samples. The specific surface area was determined by single-point BET, using a Quantasorb QS10 device. The samples were outgassed for 4 hours under helium atmosphere at 200° C.

TABLE 1

| | Gel Preparation | | |
|---|---|---|---|
| Sample No. | $H_2O/SiF_4$ Mass Ratio | $NH_4OH$ (%) | SSA ($m^2/g$) |
| 1A | 4:1 | 0.0 | 326 |
| 1B | 6:1 | 0.0 | 331 |
| 1C | 8:1 | 0.0 | 366 |
| 1D | 4:1 | 0.1 | 331* |
| 1E | 6:1 | 0.1 | 346 |
| 1F | 8:1 | 0.1 | 383 |
| 1G | 4:1 | 1.0 | 231 |
| 1H | 6:1 | 1.0 | 294 |
| 1I | 8:1 | 1.0 | 315 |
| 1J | 4:1 | 5.0 | 57 |
| 1K | 6:1 | 5.0 | 144 |
| 1L | 8:1 | 5.0 | 198 |

*Average of 3 tests.

This example shows that the specific surface area increases with increased water/silicon tetrafluoride mass ratio, and is maximized when up to about 1 wt. percent ammonium hydroxide is present.

EXAMPLE 2

Silica gels were prepared by hydrolyzing silicon tetrafluoride in accordance with the method of this invention under the following conditions:
Reaction temperature=10°-25° C. in an ice bath.
Water/silicon tetrafluoride, weight ratio=8
Ammonium concentration in water=0.1 wt. percent
Silicon tetrafluoride/ethanol=16 wt. percent
Each of the preparations was air dried. Because specific surface area is a difficult determination, both six point and single point BET were obtained. Single point BET's were processed as described in Example 1. For the multiple point BET's, samples were outgassed to 0.02 Torr vacuum at 200° C. The data are summarized in Table 2.

TABLE 2

| | Results of HPLC Gel Preparation | | | | | | |
|---|---|---|---|---|---|---|---|
| | | | | | | BET Specific Surface Area ($m^2/g$) | |
| Sample No. | $SiF_4$ (g) | EtOH (g) | $SiF_4$ Conc. (%) | Prod. Gel (g) | Yield (%) | Six-point | Single Point |
| 2A | 785 | 4127 | 16.0 | 91.1 | 60.3 | 521 | 490 |
| 2B | 787 | 4135 | 16.0 | 99.3 | 65.6 | 444 | 646 |
| 2C | 810 | 4263 | 16.0 | 99.0 | 63.6 | 573 | 680 |
| 2D | 769 | 4019 | 16.1 | 90.0 | 60.9 | 487 | 511 |
| 2E | 810 | 4243 | 16.0 | 99.2 | 63.7 | 550 | 554 |
| 2F | 813 | 4266 | 16.0 | 96.8 | 61.9 | 540 | 444 |

Table 3 summarizes specific surface area and pore diameter information for the samples described in Table 2. Pore diameter was calculated in three ways known to those skilled in the art. The low standard deviation for each determination illustrates the consistency of result achieved when practicing the method of the invention.

TABLE 3

| | Summary of Pore Size Analysis | | | | | | |
|---|---|---|---|---|---|---|---|
| | Sample No. | | | | | | Standard |
| | 2A | 2B | 2C | 2D | 2E | 2F | Deviation |
| Total Pore Volume (cc/gm) | 0.87 | 0.87 | 0.92 | 0.93 | 0.79 | 0.84 | 0.052 |
| Total Surface Area (m2/gm) | 520.82 | 554.75 | 572.89 | 487.22 | 550.32 | 540.15 | |
| Avg. pore Dia. (A) (Calculated from 4 V/S BET) | 66.55 | 62.85 | 64.41 | 76.43 | 57.20 | 62.09 | 6.44 |
| Median Pore Dia. (A) | 80.09 | 74.57 | 74.27 | 96.72 | 67.96 | 77.05 | 9.81 |

TABLE 3-continued

| | Summary of Pore Size Analysis | | | | | | Standard Deviation |
|---|---|---|---|---|---|---|---|
| | Sample No. | | | | | | |
| | 2A | 2B | 2C | 2D | 2E | 2F | |
| (Based on pore vol.) Median Pore Dia. (A) | 53.39 | 49.78 | 51.67 | 63.55 | 45.93 | 50.61 | 5.96 |
| (Based on surface area) Avg. Pore (Dia. (A) - 3 Methods | 66.88 | 62.40 | 63.45 | 78.90 | 57.03 | 63.25 | |

EXAMPLE 3

Samples 2A and 2B, prepared as described in Example 2, were combined, ground, and classified into preselected size ranges. About one-half (96 g) of the material was recovered in five products, as described below.

Product 3A: milled straight to 5 microns and not classified (23 g)

Products 3B1 and 3B2: milled to 10 microns, classified, coarse portion (23 g and 37 g)

Products 3C1 and 3C2: milled to 10 microns, classified, fine portion (3 g and 10 g)

Table 4 below summarizes the particle size distribution for these products and for Amicon's Matrex ® 10 micron, 100 Angstrom product after removal of the sub-micron particles. The data indicate that the products of the invention have particle size distributions which are appropriate for use in HPLC.

TABLE 4

| Percent Smaller Than | Amicon[1] | Product | | | | |
|---|---|---|---|---|---|---|
| | | 3A | 3B1 | 3B2 | 3C1 | 3C2 |
| 2 microns | 1 | 13 | 2 | 2 | 13 | 13 |
| 4 microns | 8 | 42 | 13 | 13 | 47 | 42 |
| 6 microns | 18 | 70 | 24 | 24 | 72 | 70 |
| 8 microns | 23 | 89 | 35 | 37 | 90 | 88 |
| 10 microns | 36 | 94 | 48 | 52 | 95 | 94 |
| 15 microns | 61 | 99 | 68 | 73 | 99 | 99 |
| 20 microns | 82 | 100 | 86 | 89 | 100 | 100 |

[1]Matrex ® 10 micron; 100 Angstrom pores

Sample 3B2 was bonded with chlorodimethyloctadecylsilane and endcapped with chlorotrimethylsilane in accordance with the above-described method of preparing reversed phase silica gels. The sample, labeled 3B2-Bond, had particle size of 10 microns and pore diameter of 64 Angstroms.

The pH and chemical analysis of various products of this invention and commercially available products are illustrated in Table 5 below. The relatively low impurity levels, especially aluminum, iron, and water-extractable fluorine and silicon, in Sample 3B2-Bond of the invention are attributed to the conditioning prior to bonding and solvent washing thereafter.

Table 5 illustrates that products of the invention typically have lower metal ion concentrations than do other commercially available products. The iron and aluminum levels in products 3A and 3C2 of the invention are higher than these iron levels of unprocessed Product Si. The higher iron content is due to the use of the hammer mill during size reduction, and slightly higher aluminum contents are due to the classifier. Products of the invention have a relatively low pH and high water extractable fluorine content, which can be removed by conditioning, as described in the specification.

TABLE 5

Comparison of Impurities Present in Various Silica Products

| Sample | Product Si[a] | Product 3A | Product 3C2 | 3B2-Bond | Amicon | Whatman | Zorbax[b] | LiChropher[b] |
|---|---|---|---|---|---|---|---|---|
| | Surface pH (2% suspension in water) | | | | | | | |
| | 2.92 | 2.99 | 2.88 | 4.48 | 6.42 | 4.58 | 4.3 | — |
| | Chemical Analysis (ppm) | | | | | | | |
| Na | 1.3 | 8.5 | 11.9 | 15.5 | 439 | 8.5 | 105 | 2900 |
| K | 0.6 | 1.7 | 2.4 | <5 | 41 | 2.1 | — | — |
| Li | <0.2 | <1 | <1 | <1 | <0.2 | <0.2 | <5 | <5 |
| Ca | 2.8 | 0.1 | 5.6 | 17.5 | 493 | 168 | <5 | <5 |
| Mg | 1.3 | 6.3 | 9.1 | 4.3 | 112 | 41 | — | — |
| Al | 1.2 | 20.0 | 23.4 | 2.3 | 146 | 51 | 1100 | — |
| Fe | 2.3 | 44.6 | 69.6 | 7.5 | 46 | 28 | 445 | 68 |
| Co | 0.0 | 0.7 | 0.9 | 0.0 | 0.1 | 0.0 | — | — |
| Ni | 0.1 | 1.3 | 2.1 | 0.5 | 0.0 | 0.1 | — | — |
| Cu | 0.1 | 7.6 | 9.2 | 0.4 | 0.2 | 0.2 | 245 | — |
| Mn | 0.1 | 0.8 | 1.0 | 0.6 | 0.5 | 0.4 | — | 31 |
| Pb | 0.6 | 2.0 | 4.2 | 0.0 | 1.8 | 0.7 | — | — |
| Ba | 0.2 | 16.8 | 41.0 | 0.6 | 18.8 | 4.1 | — | 81 |
| Cd | 0.0 | 0.2 | 0.2 | 0.0 | 0.0 | 0.0 | — | — |
| Cr | 0.1 | 1.7 | 2.0 | 2.0 | 1.5 | 0.4 | 115 | — |
| Mo | 0.0 | 0.1 | 0.3 | 0.0 | 0.0 | 0.0 | — | — |
| Sr | 0.0 | 0.1 | 0.2 | 0.0 | 1.8 | 0.5 | — | — |
| Zn | 0.4 | 6.4 | 19.8 | 0.6 | 0.8 | 0.5 | — | — |
| P | 0.8 | 4.6 | 5.4 | 0.0 | 0.4 | 0.2 | — | — |
| S | 12.4 | 2.9 | 11.7 | 0.0 | 70.5 | 13.8 | — | — |
| V | 0.0 | 0.4 | 0.5 | 0.7 | 0.3 | 0.0 | — | — |
| F %[c] | 0.52 | 0.31 | 0.50 | 0.01 | | | | |
| Si %[c] | — | 0.29 | 0.34 | 0.21 | | | | |
| Cl | | | | 60 | | | | |

TABLE 5-continued

| | Comparison of Impurities Present in Various Silica Products | | | | | | | |
|---|---|---|---|---|---|---|---|---|
| Sample | Product Si[a] | Product 3A | Product 3C2 | 3B2-Bond | Amicon | Whatman | Zorbax[b] | LiChropher[b] |
| SO₄ | | | | | 300 | | | |

[a]100-gram batch of silica from the combination of Samples 2A and 2B before grinding and sizing.
[b]Not derived from chemical analysis.
[c]Water extractable.

EXAMPLE 4

The separation performance of silica columns of the invention (silicon tetrafluoride hydrolysis) was compared with column packed with Amicon Matrex® silica. The liquid chromatograph system consisted of a Waters 590 solvent delivery pump, a Beckman 210 sample injection valve, a Waters 481 variable UV-VIS detector, and a Waters 740 recorder. Flowrates of 0.5, 1.0, and 2.0 ml per minute were used for constructing the van Deemeter plots. The following four sets of compounds were injected in this column evaluation:

I. Toluene, 1,3-dinitrobenzene, benzaldehyde
II. Toluene, nitrobenzene, acetophenone, 2,6-dinitrotoluene
III. Dimethyl-, diethyl-, and dibutylphthalate homologues
IV. 1,2-, 1,3-, and 1,4-dinitrobenzene isomers Toluene was used as the void volume marker in normal phase chromatography. The mobile phase solvents for each set were:

I. hexane:methylene chloride 44:56 (v/v)
II. hexane:ethyl acetate 98:2 (v/v)
III. isooctane:tetrahydrofuran 95:5 (v/v)
IV. isooctane:tetrahydrofuran 95:5 (v/v)

Overall separation performance was based on the resolution equation:

$$R_s = \frac{N^{\frac{1}{2}}}{4}\left(\frac{alpha - 1}{alpha}\right)\left(\frac{k'}{1 + k'}\right) \quad (4)$$

$$k' = \frac{t - t_o}{t_o} \quad (5)$$

where
$R_s$: overall resolution between two adjacent peaks
N: column plate count
k': solute capacity factor
alpha: selectivity ($=k'_2/k'_1$)
$t_o$: column void time (seconds)

The first term is indicative of column efficiency (i.e., peak sharpness), the second term selectivity (i.e., distance between two peaks), and the third term retention capacity or loading.

Figure 2:
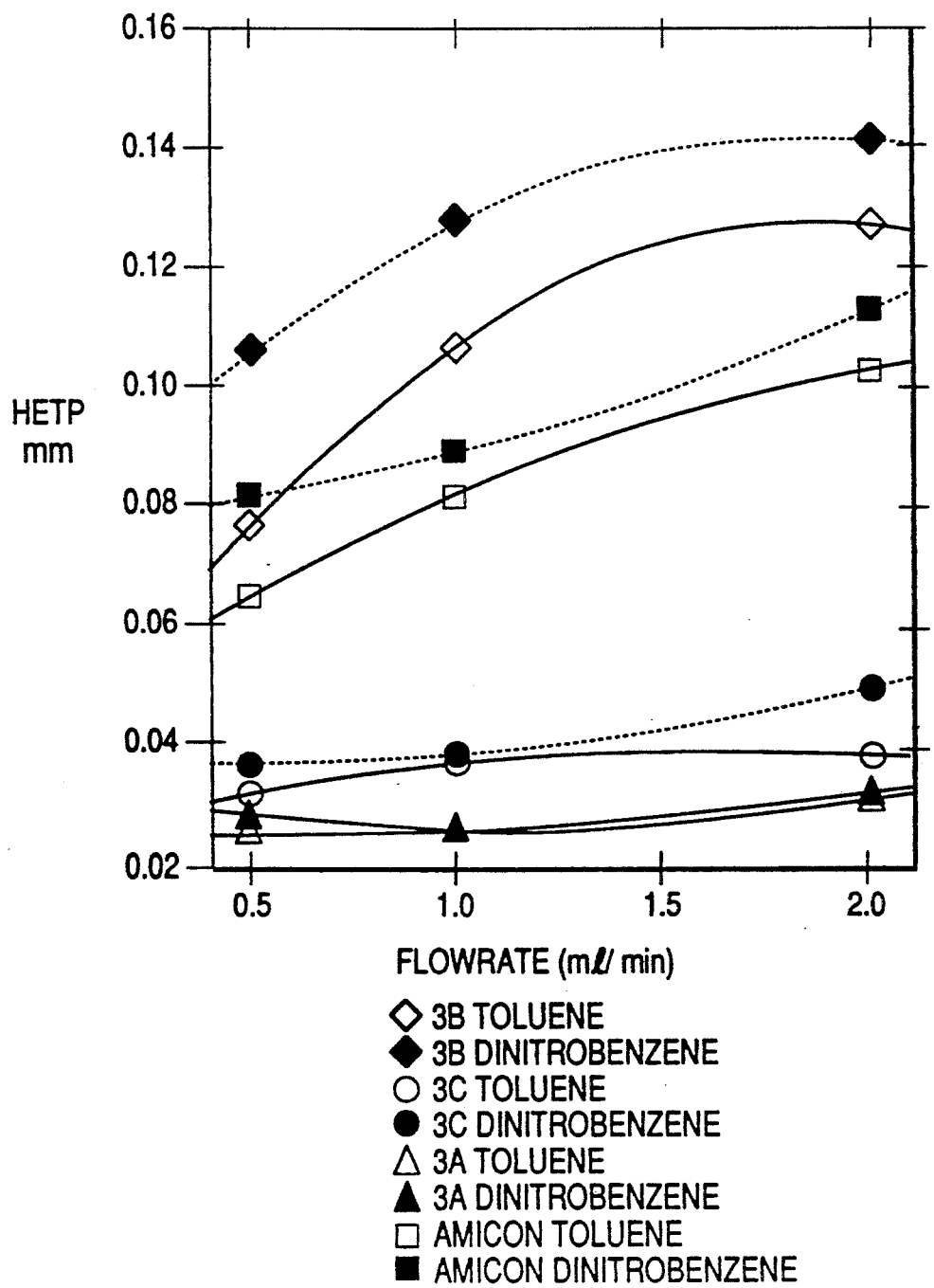
FIG. 2 is the van Deemeter plots corresponding to the separations illustrated in FIG. 1.

The separation of compound Set I is illustrated in FIG. 1 for four different columns. The corresponding van Deemeter plots are shown in FIG. 2 and the overall performance (i.e., $R_S$), including efficiency, selectivity, and capacity, is shown in Table 6. Because of the higher surface area which provides greater retention capacity, the silicas of the invention had several advantages over the Amicon silica:

1) About 10% better overall separation performance for 10 micron silica (i.e. 3B2). The 30% better capacity was achieved at the expense of column efficiency (about 15% less) due to longer retention time. This can be seen in FIG. 2 where 3B2 has slightly larger HETP values (i.e. lower N plate counts) than Amicon.

2) For 5 micron Products 3C2 and 3A-Dried columns, about 100% better overall performance was realized because of not only higher efficiency due to smaller particle size but also higher retention capacity. Small-size particles tend to yield less dispersion in both interstice void zones and micropores. The relatively large portion (about 13 percent) of particles sized up to 2 microns in these samples necessitated the high pressure drop for these columns. Amicon does not have 5 micron silica products.

Figure 3:
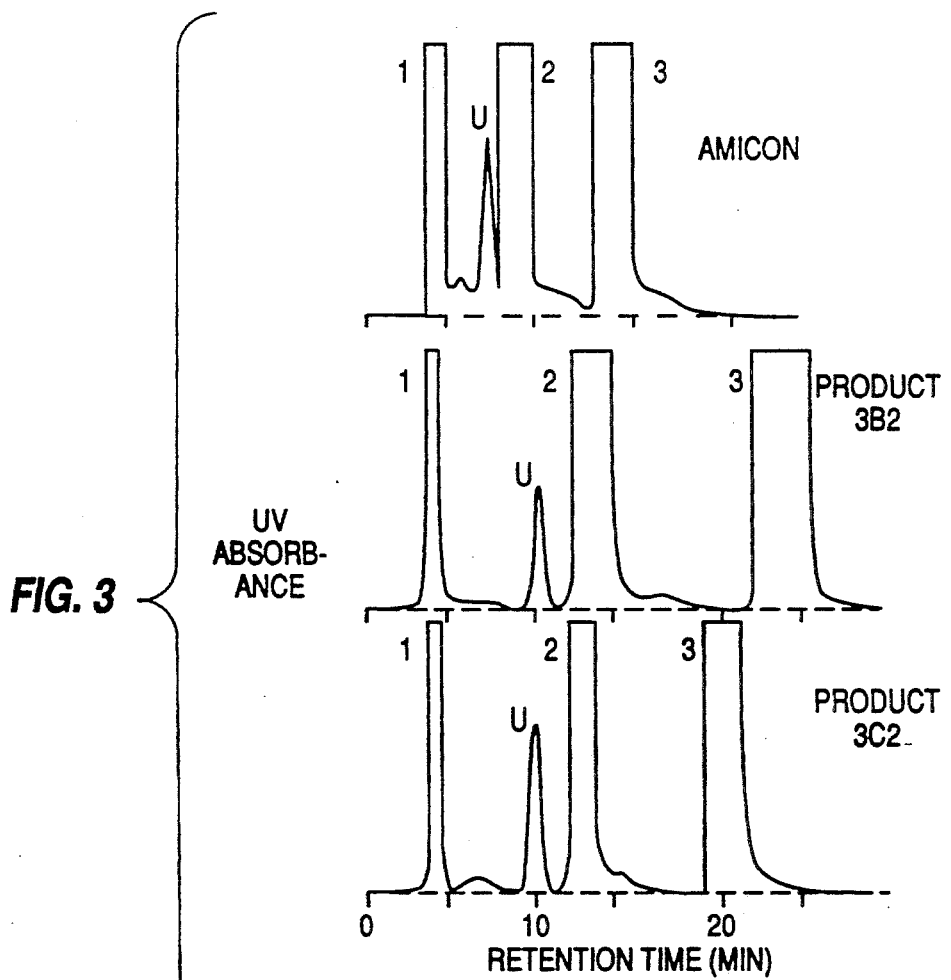
FIGS. 3-8 illustrate various comparisons of separation performance.

The loading capacity of silica columns made in accordance with the invention was compared to that of the Amicon product. The overall performance decreased with increasing sample size (Table 7) when the sample concentration remained constant. A sample loop one order of magnitude greater (from 20 to 200 microliter) in the 3C2 column yielded better resolution than Amicon column (20 microliter loop), demonstrating that silica of the invention can be used for large-scale operations. A side-by-side comparison of columns overloaded with a mixture (FIG. 3) further indicates that both Product 3B2 and 3C2 silica columns can achieve baseline separation for a desired component in mixtures, thus improving product purity and throughput.

Figure 4:
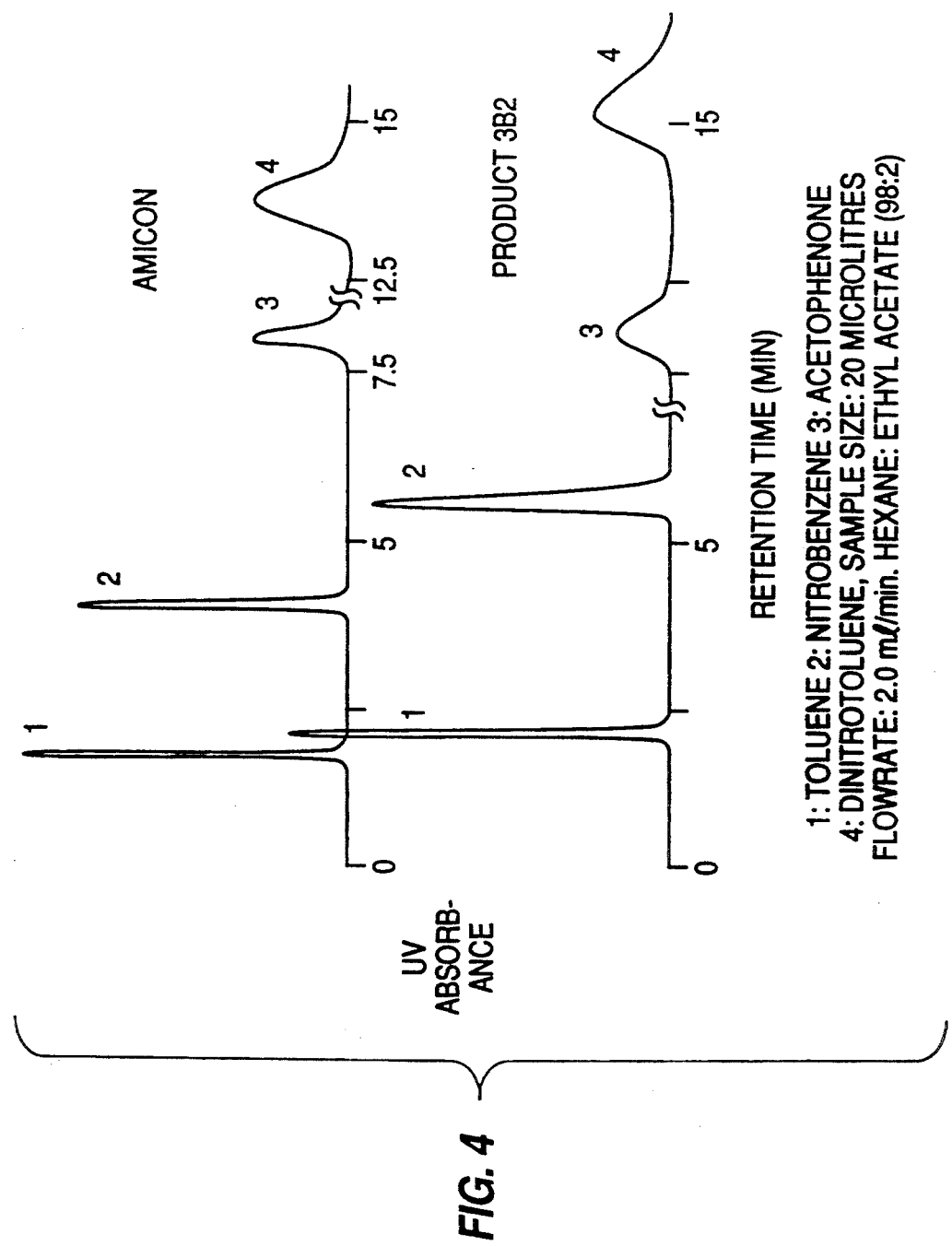
Figure 5:
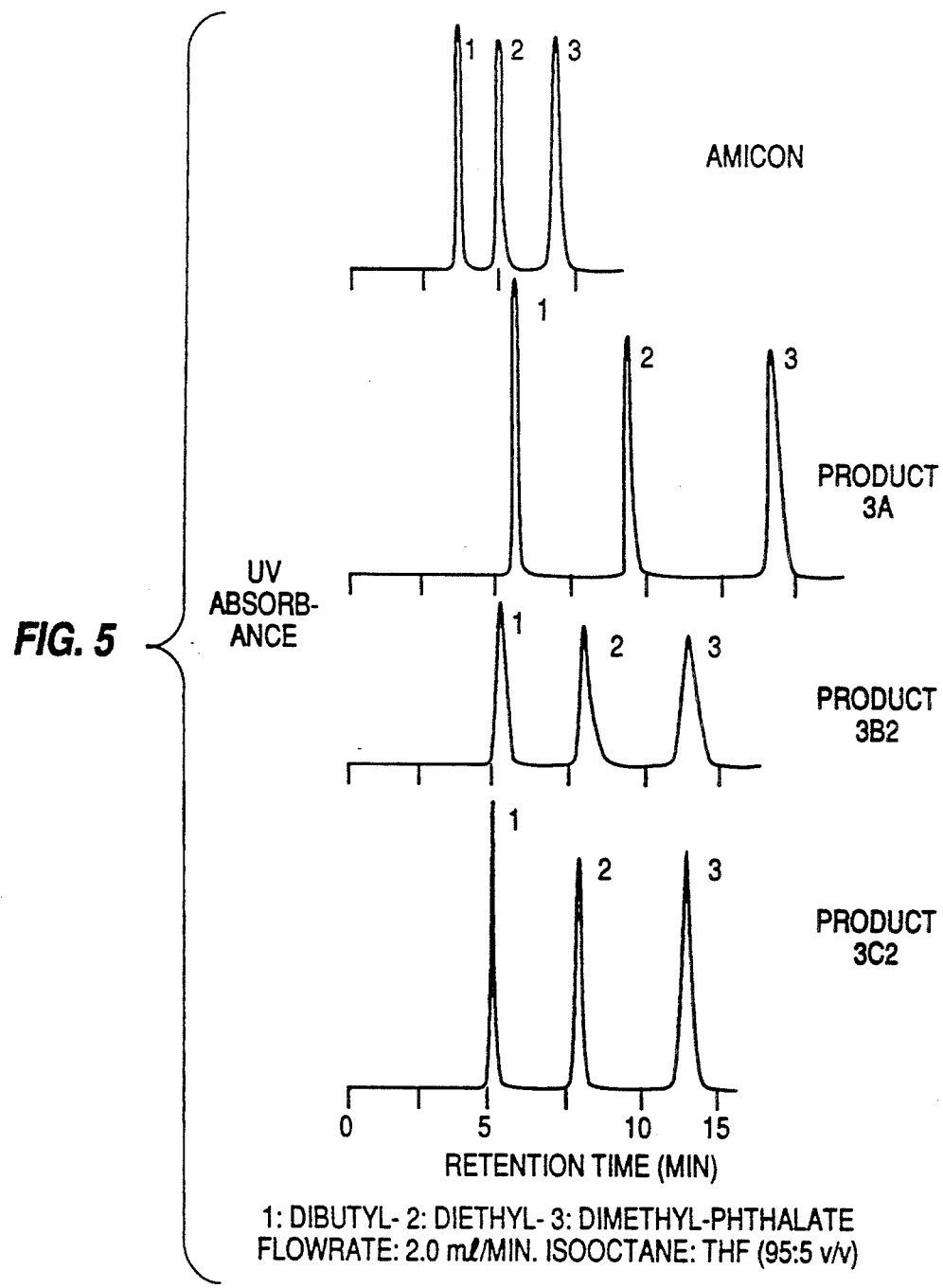
Figure 6:
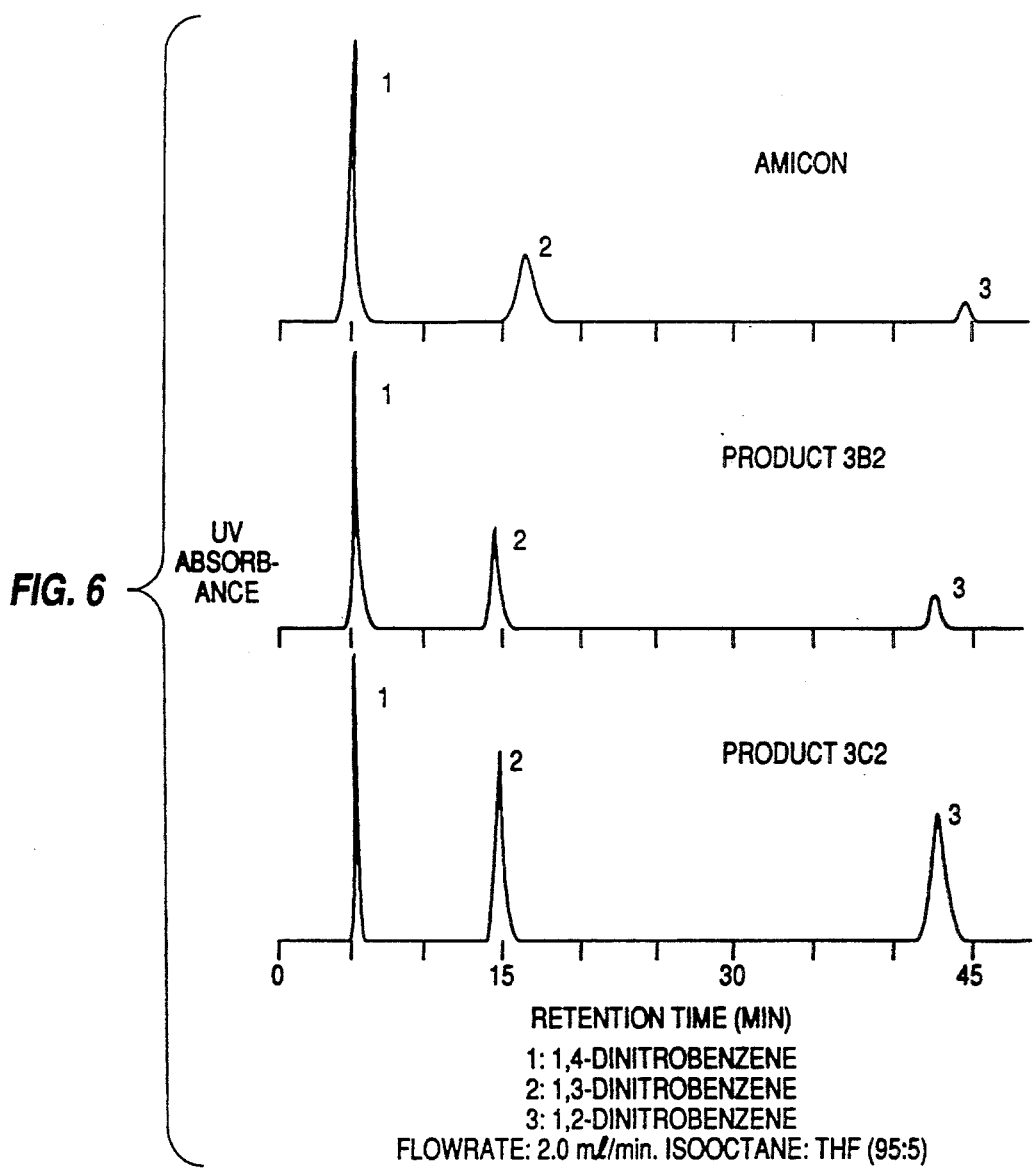

Silica columns prepared in accordance with the invention also performed better than the 10-micron Amicon column for separations of aromatic compounds (Set II, FIG. 4), homologues (Set III, FIG. 5), and isomers (Set IV, FIG. 6) under identical conditions. The overall separation performance on Sets II and III is summarized in Tables 8 and 9. A plate count of greater than 60,000/meter was achieved for Product 3A column at a flowrate of 1.0 ml/min for the separation of Set II samples. This high plate count, achieved by irregular silica, is comparable to plate counts achieved by spherical silica.

TABLE 6

Overall Separation Performance for
Products of the Invention and Amicon Columns
Separation Set I:
Toluene, 1,3-Dinitrobenzene, Benzaldehyde[1]

| Column (Part. Size ± Deviation)[2] | Flowrate (ml/min) | Pressure Drop (psi) | Efficiency $\sqrt{N}/4$ | Selectivity (alpha-1)/alpha | Capacity k'/(1 + k') | Overall $R_s$ |
|---|---|---|---|---|---|---|
| Amicon | 2.0 | 110 | 11.8 | 0.52 | 0.53 | 3.3 |
| (13.2 | 1.0 | 6 | 13.2 | 0.53 | 0.54 | 3.8 |
| 7.6 microns) | 0.5 | 0 | 13.9 | 0.54 | 0.54 | 4.1 |
| IMC 3B2 | 2.0 | 232 | 10.5 | 0.53 | 0.70 | 3.9 |

TABLE 6-continued

Overall Separation Performance for
Products of the Invention and Amicon Columns
Separation Set I:
Toluene, 1,3-Dinitrobenzene, Benzaldehyde[1]

| Column (Part. Size + Deviation)[2] | Flowrate (ml/min) | Pressure Drop (psi) | Efficiency $\sqrt{N}/4$ | Selectivity (alpha-1)/alpha | Capacity $k'/(1 + k')$ | Overall $R_s$ |
|---|---|---|---|---|---|---|
| (10.9 | 1.0 | 54 | 11.1 | 0.53 | 0.71 | 4.2 |
| 6.8 microns) | 0.5 | 0 | 12.1 | 0.53 | 0.71 | 4.6 |
| Product 3C2 | 2.0 | 2380 | 17.8 | 0.51 | 0.71 | 6.4 |
| (4.9 | 1.0 | 1080 | 20.0 | 0.51 | 0.71 | 7.2 |
| 2.6 microns) | 0.5 | 450 | 20.5 | 0.51 | 0.72 | 7.5 |
| Product 3A-Dried | 2.0 | 2950 | 22.4 | 0.50 | 0.70 | 7.8 |
| (4.9 | 1.0 | 1300 | 24.5 | 0.50 | 0.71 | 8.7 |
| 2.5 microns) | 0.5 | 580 | 23.5 | 0.51 | 0.72 | 8.6 |
| Product 3A-Not Dried | 2.0 | 2580 | 5.2 | 0.51 | 0.69 | 1.8 |
| (4.9 | 1.0 | 1170 | 5.1 | 0.51 | 0.70 | 1.8 |
| 2.5 microns) | 0.5 | 513 | 6.4 | 0.50 | 0.71 | 2.3 |

[1]N and k' were determined using the dinitrobenzene peak, alpha using dinitrobenzene and benzaldehyde peaks.
[2]Deviation was measured using the sizes at 84% and 16% cuts.

TABLE 7

Overall Separation Performance for Overloaded Columns
Separation Set I:
Toluene; 1,3-Dinitrobenzene, Benzaldehyde[1]

| Column | Sample Loop (microliter) | Efficiency $\sqrt{N}/4$ | Selectivity (alpha-1)/alpha | Capacity $k'/(1 + k')$ | Overall $R_s$ |
|---|---|---|---|---|---|
| Amicon | 20 | 13.2 | 0.53 | 0.54 | 3.8 |
|  | 100 | 12.8 | 0.51 | 0.48 | 3.1 |
|  | 200 | 11.3 | 0.46 | 0.44 | 2.3 |
|  | 500 | 8.6[2] | 0.52 | 0.51 | 2.3 |
| Product 3B2 | 20 | 11.1 | 0.53 | 0.71 | 4.2 |
|  | 100 | 11.2 | 0.49 | 0.66 | 3.6 |
|  | 200 | 10.4 | 0.48 | 0.61 | 3.0 |
|  | 500 | 9.3[2] | 0.51 | 0.65 | 3.1 |
| Product 3C2 | 20 | 20.0 | 0.51 | 0.71 | 7.2 |
|  | 100 | 19.0 | 0.49 | 0.70 | 6.5 |
|  | 200 | 17.7 | 0.49 | 0.71 | 6.2 |
|  | 500 | 15.0[2] | 0.49 | 0.66 | 4.8 |

[1]Sample concentration: toluene 0.04 mg, 1,3-dinitrobenzene 0.001 mg, benzaldehyde 0.006 mg in 10 ml mobile phase solvent (hexane: methylene chloride 44:56 by volume)
[2]Bandwidth is estimate due to off-scale peak.
[3]$R_s$ = 1.5 for baseline resolution (Equation 4).

TABLE 8

Overall Separation Performance
Separation Set II:
Toluene, Nitrobenzene, Acetophenone, 2,6-Dinitrotoluene[1]

| Column (Part. Size + Deviation[3]) | Flowrate (ml/min) | Efficiency $\sqrt{N}/4$ | Selectivity (alpha-1)/alpha | Capacity $k'/(1 + k')$ | Overall $R_s$ |
|---|---|---|---|---|---|
| Amicon | 2.0 | 12.0 | 0.65 | 0.52 | 4.2 |
| (13.2 | 1.0 | 12.6 | 0.67 | 0.53 | 4.5 |
| 7.6 microns) | 0.5[2] | 15.1 | 0.65 | 0.52 | 5.1 |
| Product 3B2 | 2.0 | 11.8 | 0.64 | 0.63 | 4.8 |
| (10.9 | 1.0 | 11.5 | 0.65 | 0.60 | 4.5 |
| 6.8 microns) | 0.5[2] | 14.3 | 0.66 | 0.63 | 5.9 |
| Product 3C2 | 2.0 | 18.8 | 0.64 | 0.61 | 7.3 |
| (4.9 | 1.0[2] | 20.4 | 0.64 | 0.61 | 8.0 |
| 2.6 microns) | 0.5 | 19.7 | 0.64 | 0.61 | 7.7 |
| Product 3A-Dried | 2.0 | 24.4 | 0.64 | 0.62 | 9.7 |
| (4.9 | 1.0[2] | 30.8 | 0.64 | 0.62 | 12.2 |
| 2.5 microns) | 0.5 | 23.4 | 0.69 | 0.66 | 10.7 |

[1]N and k' were determined using the acetophenone peak, alpha using acetophenone and dinitrotoluene peaks.
[2]Optimal flow rate 0.5 ml/min. for Amicon and Product 5C columns, 1.0 ml/min. for Products 5F and 1-Dried columns (n = 15,200).
[3]Deviation was measured using the sizes at 84 & 16% cuts.

TABLE 9

Overall Separation Performance
Separation Set III:
Dibutyl-, Diethyl-, Dimethyl-Phthalate Homologues[1]

| Column (Part. Size + Deviation) | Flowrate (ml/min) | Efficiency $\sqrt{N}/4$ | Selectivity (alpha-1)/alpha | Capacity $k'/(1 + k')$ | Overall $R_s$ |
|---|---|---|---|---|---|
| Amicon | 2.0 | 11.1 | 0.59 | 0.47 | 3.1 |

TABLE 9-continued

Overall Separation Performance
Separation Set III:
Dibutyl-, Diethyl-, Dimethyl-Phthalate Homologues[1]

| Column (Part. Size + Deviation) | Flowrate (ml/min) | Efficiency $\sqrt{N}/4$ | Selectivity (alpha-1)/alpha | Capacity k'/(1 + k') | Overall $R_s$ |
|---|---|---|---|---|---|
| (13.2 | 1.0 | 12.4 | 0.60 | 0.47 | 3.5 |
| 7.6 microns) | 0.5 | 12.2 | 0.61 | 0.48 | 3.6 |
| Product 3B2 | 2.0 | 9.3 | 0.55 | 0.55 | 2.8 |
| (10.9 | 1.0 | 10.5 | 0.54 | 0.55 | 3.1 |
| 6.8 microns) | 0.5 | 11.2 | 0.56 | 0.54 | 3.4 |
| Product 3C2 | 2.0 | 16.7 | 0.55 | 0.56 | 5.1 |
| (4.9 | 1.0 | 20.0 | 0.55 | 0.56 | 6.2 |
| 2.6 microns) | 0.5 | 21.1 | 0.55 | 0.56 | 6.5 |
| Product 3A-Dried | 2.0 | 20.0 | 0.56 | 0.60 | 6.7 |
| (4.9 | 1.0 | 20.8 | 0.55 | 0.59 | 6.7 |
| 2.5 microns) | 0.5 | 28.4 | 0.53 | 0.59 | 8.9 |

[1] N and k' were determined using the dimethylphthalate peak, alpha using diethyl- and dibutyl-phthalate peaks.
[2] Deviation was measured using the size at 84 and 16 percent

EXAMPLE 5

Silica gel was produced in accordance with the method of this invention, wherein the concentration of silicon tetrafluoride in methanol solvent was varied to determine the effect of this parameter on specific surface area.

Silicon tetrafluoride was bubbled through alcohol until the desired concentration was reached. A quantity of 0.1 wt. percent ammonium hydroxide sufficient to make the wt. ratio of ammonia solution to silicon tetrafluoride equal 8 then was added to the alcohol solution. The mixture was briefly agitated to ensure proper mixing, then was allowed to set. The heat of reaction raised the temperature of the mixture from room temperature to about 38° C.

After 24 hours, the gel was collected by suction filtration or centrifugation, then was washed with deionized water containing 0.003 percent NH$_4$OH, followed by deionized water, until the pH of the wash water was greater than 5.0. The gel was allowed to soak for at least 2 hours before the pH was determined. After a pH of at least 5 was obtained, the gel was collected by suction filtration and dried at 150° C. for 15 hours at a vacuum of about −28 to −29 inches Hg. The data summarized in Table 10 illustrate that specific surface area decreases as silicon tetrafluoride concentration increases.

TABLE 10

| Sample | Silicon Tetrafluoride Concentration Wt. Percent | Specific Surface Area, m$^2$/g |
|---|---|---|
| A | 13 | 570 |
| B | 16 | 535 |
| C | 20 | 490 |
| D | 24 | 440 |
| E | 26 | 405 |
| F | 31 | 390 |

EXAMPLES 6A-D

Silica gel products having selected specific surface areas and average pore diameters were prepared in accordance with the method of this invention as described in Example 5. Process parameters were varied to achieve the preselected product characteristics.

Silicon tetrafluoride was bubbled through alcohol to achieve a preselected silicon tetrafluoride concentration. A predetermined amount of 0.1 wt. percent ammonium hydroxide then was added to the alcohol solution and the mixture was briefly agitated to ensure proper mixing. The gelling medium then was allowed to stand without further agitation. Each reaction was started at a temperature of 22° C., and none exceeded 38° C. as the heat of reaction evolved.

After 24 hours, the gel was collected by suction filtration or centrifugation and washed until the pH of the waste water wash was greater than 5.0 with deionized water having an ammonium hydroxide concentration of 0.003 percent, followed by pure deionized water. During the washing cycle, the gel was allowed to soak in the wash for approximately 2 hours before the pH was tested. Spent wash medium then was decanted and fresh wash was added. Upon obtaining a pH of at least about 5 in the waste wash medium, the gel was collected via suction filtration and dried at 150° C. for 15 hours under vacuum.

The following tables illustrate the results of these preparations.

TABLE 11A

| Desired Specific Surface Area | | 550 ± 30 m$^2$/g |
| Average Pore Diameter | | 60 Angstroms |
| Pore Volume | | 0.88 cc/g |

| Sample | Solvent | % SiF$_4$ in Solvent | Actual Specific Surface Area, m$^2$/g |
|---|---|---|---|
| 6A-1 | Ethanol | 16 | 585 |
| 6A-2 | Ethanol | 16 | 561 |
| Avg. of 6 Runs[1] | Ethanol | 16 | 538 |

Note:
[1] These runs started at a temperature of 10° C.
[2] Mass ratio of 0.1 wt. percent ammonium hydroxide solution to SiF$_4$ is 8.

TABLE 11B

| Desired Specific Surface Area | | 460 ± 30 m$^2$/g |
| Average Pore Diameter | | 86 Angstroms |
| Pore Volume | | 1.01 cc/g |

| Sample | Solvent | % SiF$_4$ in Solvent | Actual Specific Surface Area, m$^2$/g |
|---|---|---|---|
| 6B1 | Methanol | 16 | 468 |
| 6B2 | Methanol | 16 | 443 |
| 6B3 | Ethanol | 16 | 522 |
| 6B4 | Ethanol | 16 | 487 |
| 6B5 | Methanol | 16 | 452 |
| 6B6 | Methanol | 16 | 477 |
| 6B7 | Methanol | 16 | 430 |
| 6B8 | Methanol | 16 | 460 |
| 6B9 | Methanol | 16 | 434 |

Note: Mass ratio of 0.1 wt. percent ammonium hydroxide solution to SiF$_4$ is 4.

TABLE 11C

| | Desired Specific Surface Area | 400 ± 30 m²/g | |
|---|---|---|---|
| | Average Pore Diameter | 115 Angstroms | |
| | Pore Volume | 1.03 cc/g | |
| Sample | Solvent | % SiF₄ in Solvent | Actual Specific Surface Area, m²/g |
| 6C1 | Methanol | 32 | 361 |
| 6C2 | Methanol | 32 | 423 |
| 6C3 | Ethanol | 32 | 382 |
| 6C4 | Ethanol | 32 | 427 |

Note: Mass ratio of 0.1 wt. percent ammonium hydroxide solution to SiF₄ is 8.

TABLE 11D

| | Desired Specific Surface Area | 230 m²/g | |
|---|---|---|---|
| | Average Pore Diameter | 170 Angstroms | |
| | Pore Volume | 0.80 cc/g | |
| Sample | Solvent | % SiF₄ in Solvent | Actual Specific Surface Area, m²/g |
| 6D1 | Methanol | 16 | 236 |
| 6D2 | Methanol | 16 | 232 |

Note: Mass ratio of 0.1 wt. percent ammonium hydroxide solution to SiF₄ is 1.

then separated from the mixture, washed, and dried. Samples were outgassed at 250° C. for about 1–2 hours under helium atmosphere before testing.

The results are illustrated in Table 12.

TABLE 12

| Sample | Mols 4% HF Sol'n / Mol SiCl₄ | BET Specific Surface Area, m²/g — Single Point | BET Specific Surface Area, m²/g — Five Point | Pore Size, Angstroms[1] |
|---|---|---|---|---|
| 7-1 | 5.1 | 595 | 569 | 57 |
| 7-2 | 5.1 | 588 | 591 | 51 |
| 7-3 | 12.8 | 333 | 357 | 106 |
| 7-4 | 12.8 | 341 | 351 | 107 |

[1]Twenty-five point analyses on ASAP-2400.

EXAMPLE 8

The normal and reversed phase separation performance of silica columns of the invention (silicon tetrachloride hydrolysis) was compared with Amicon silicas in a liquid chromatograph system as described in Example 4. The properties of the silicas are presented in Table 13.

TABLE 13

| Sample | Surface Area (m²/g) (1) | Pore Vol. (cc/g) | Avg. Pore Size (2) | Avg. Particle Size (3) | Bonding Reagent (4) | Surface Cov. (5) |
|---|---|---|---|---|---|---|
| 8-1 | 550 | 0.90 | 66 | 9.3 ± 6.2 | NA | NA |
| 8-1R | 139 | 0.16 | 46 | 11.0 ± 8.3 | TODS | 2.71 |
| 8-2 | 319 | 0.89 | 112 | 10.0 ± 6.7 | NA | NA |
| 8-2R | 154 | 0.42 | 102 | 13.4 ± 9.2 | TODS | 3.14 |
| 8-3 | 320 | 1.06 | 132 | 4.5 ± 2.4 | NA | NA |
| 8-4R | 144 | 0.42 | 116 | 5.5 ± 2.6 | MODS | 3.11 |
| 8-5R | 175 | 0.48 | 109 | 4.0 ± 2.5 | TODS | 3.90 |
| Amicon 60A | 442 | 0.74 | 67 | 9.9 ± 5.9 | NA | NA |
| Amicon 100A | 351 | 1.26 | 138 | 10.2 ± 6.0 | NA | NA |
| AMIC-C18 (6) | 179 | 0.86 | 120 | 10.8 ± 6.9 | TODS | 3.34 |

(1) Surface areas for reversed phase material were measured after endcapping.
(2) Assuming cylindrical pores, Av. Pore Size (Angstroms) = $\frac{40{,}000\,V}{S.A.}$
where V = pore volume and S.A. = surface area.
(3) Microns
(4) NA = Not applicable
TODS = octadecyltrichlorosilane
MODS = chlorodimethyloctadecylsilane
(5) Micromols/m²
(6) Fractionated to form a 60 Angstrom product (AMIC C18 60A) and a 100 Angstrom product (AMIC C18 100A)

EXAMPLE 7

Silica gel products having selected specific surface area and average pore diameter were prepared in accordance with the method of the invention. Process parameters were varied to achieve the selected product characteristics.

Silicon tetrachloride was dissolved in methanol to obtain a solution containing about 16 wt. percent silicon tetrachloride. A predetermined quantity of 4% HF solution then was added to the alcohol solution, and the mixture was briefly agitated to ensure thorough mixing. The gel which formed was aged at 77° C. for 4 hours, Two sets of compounds were injected:
8-I. Toluene, 2,6-dinitrotoluene, benzaldehyde
8-II. Uracil, benzaldehyde, benzene, toluene The mobile phases were:
8-I. Hexane:methylene chloride 44:56(v/v)
8-II. Methanol:water 80:20 (v/v)

Figure 7:
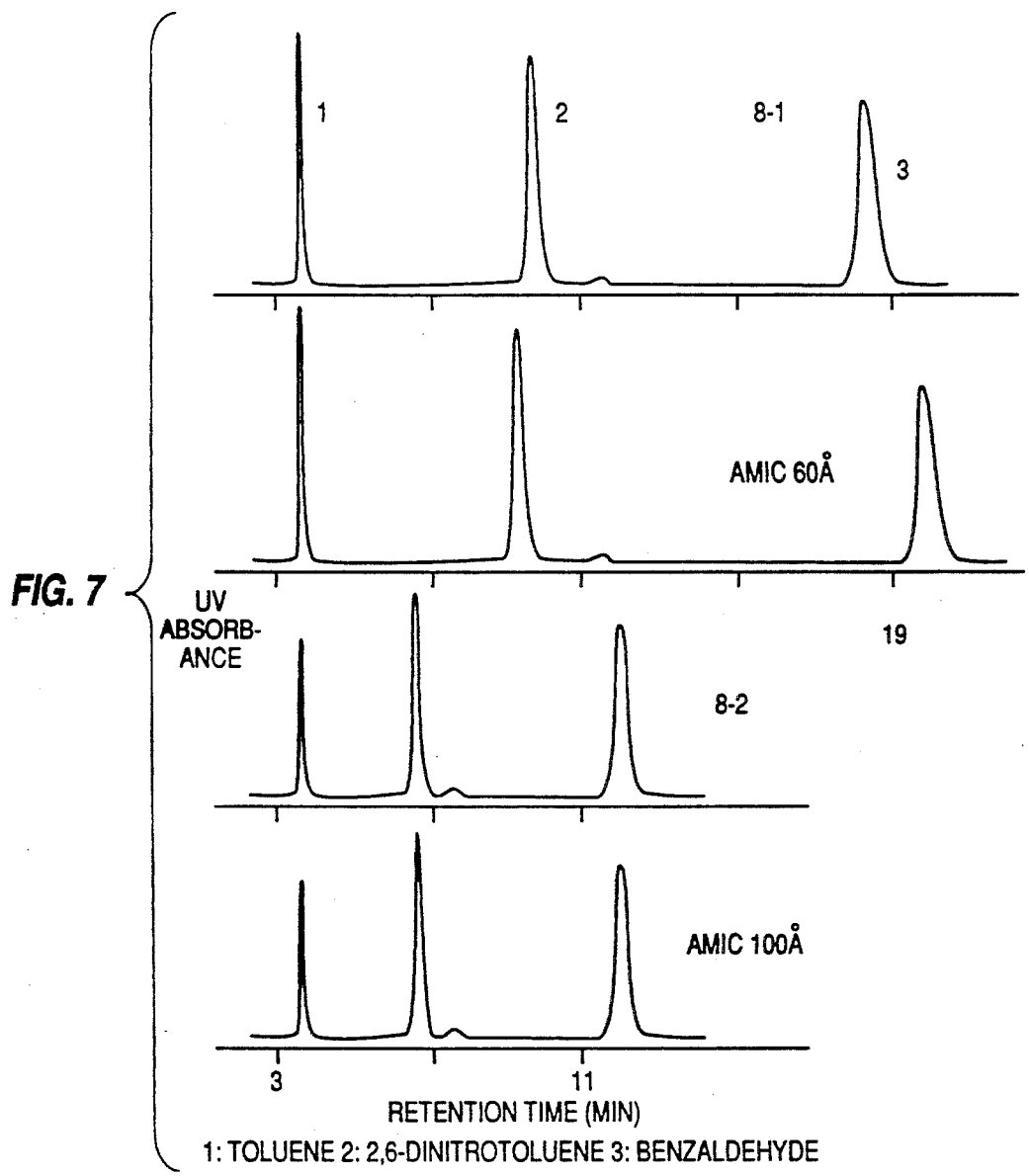

Performance was analyzed as described in Example 4. The separation of Compound Set I is illustrated in FIG. 7, and the overall performance is summarized in Table 14. As illustrated therein, the resolution of the product of the invention is comparable to the corresponding Amicon product.

TABLE 14

OVERALL SEPARATION PERFORMANCE FOR PRODUCTS OF THE INVENTION AND AMICON COLUMNS
Separation Set 8-I:
Toluene, 2,6-Dinitrotoluene, Benzaldehyde (1)

| Sample | Flowrate (ml/min) | Press. Drop (psi) | Efficiency $\sqrt{N}/4$ | Selectivity (alpha-1)/alpha | Capacity k'/(1 + k') | Overall $R_s$ |
|---|---|---|---|---|---|---|
| 8-1 | 2.0 | 760 | 18.4 | 0.59 | 0.62 | 6.7 |
| | 1.0 | 370 | 22.1 | 0.59 | 0.63 | 8.2 |

TABLE 14-continued

OVERALL SEPARATION PERFORMANCE FOR
PRODUCTS OF THE INVENTION AND AMICON COLUMNS
Separation Set 8-I:
Toluene, 2,6-Dinitrotoluene, Benzaldehyde (1)

| Sample | Flowrate (ml/min) | Press. Drop (psi) | Efficiency $\sqrt{N}/4$ | Selectivity (alpha-1)/alpha | Capacity $k'/(1 + k')$ | Overall $R_s$ |
|---|---|---|---|---|---|---|
|  | 0.5 | 200 | 23.7 | 0.60 | 0.62 | 8.7 |
| 8-2 | 2.0 | 300 | 17.2 | 0.62 | 0.39 | 4.2 |
|  | 1.0 | 110 | 19.7 | 0.64 | 0.44 | 5.6 |
|  | 0.5 | 10 | 20.6 | 0.64 | 0.45 | 5.8 |
| Amicon | 2.0 | 314 | 17.7 | 0.65 | 0.60 | 6.9 |
| 60A | 1.0 | 109 | 21.3 | 0.65 | 0.61 | 8.3 |
|  | 0.5 | 6 | 23.7 | 0.65 | 0.61 | 9.3 |
| Amicon | 2.0 | 280 | 19.1 | 0.69 | 0.38 | 5.0 |
| 100A | 1.0 | 95 | 21.9 | 0.69 | 0.38 | 5.8 |
|  | 0.5 | 6 | 22.8 | 0.69 | 0.39 | 6.1 |

(1) N and k' were determined using the dinitrotoluene peak, alpha using dinitrotoluene and benzaldehyde peaks.

Figure 8:
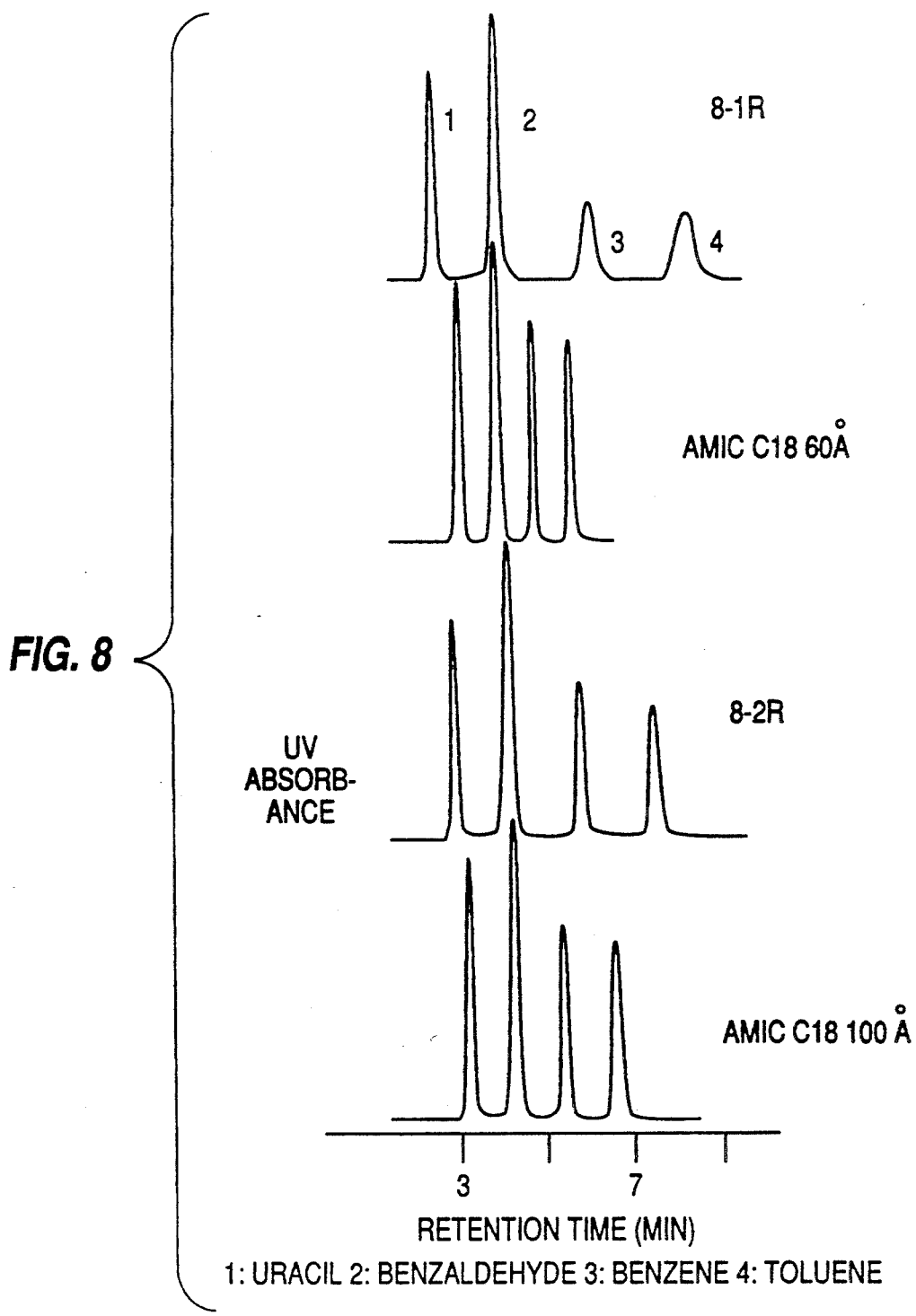

Reversed phase separation of compound Set II is illustrated in FIG. 8 for four columns. The overall performance of these and other columns is summarized in Table 15. These data illustrate the following:

(1) Products of the invention having an average pore diameter of 60 Angstroms exhibit better overall performance but less efficiency than Amicon product.
(2) Amicon's 60A product had better overall resolution, while the overall resolution of the 100 Angstrom products was comparable.
(3) Higher surface coverage by the bonding reagent improves overall performance, as illustrated by the superior overall performance of sample 8-5R over 8-4R. Octadecyltrichlorosilane provides higher surface coverage than chlorodimethyloctadecylsilane.

TABLE 15

OVERALL SEPARATION PERFORMANCE FOR
PRODUCTS OF THE INVENTION AND AMICON COLUMNS
Separation Set 8-II:
Uracil, Benzaldehyde, Benzene, Toluene (1)

| Sample | Flowrate (ml/min) | Press. Drop (psi) | Efficiency $\sqrt{N}/4$ | Selectivity (alpha-1)/alpha | Capacity $k'/(1 + k')$ | Overall $R_s$ |
|---|---|---|---|---|---|---|
| 8-1R | 2.0 | 2915 | 9.2 | 0.60 | 0.62 | 3.4 |
|  | 1.0 | 1423 | 9.7 | 0.60 | 0.62 | 3.6 |
|  | 0.5 | 663 | 13.2 | 0.59 | 0.61 | 4.7 |
| 8-2R | 2.0 | 2011 | 12.1 | 0.56 | 0.53 | 3.6 |
|  | 1.0 | 1069 | 13.5 | 0.56 | 0.52 | 3.9 |
|  | 0.5 | 520 | 16.8 | 0.56 | 0.52 | 4.9 |
| AMIC | 2.0 | 964 | 14.3 | 0.48 | 0.37 | 2.5 |
| C18 60A | 1.0 | 463 | 18.9 | 0.47 | 0.37 | 3.3 |
|  | 0.5 | 198 | 22.6 | 0.47 | 0.37 | 3.9 |
| AMIC | 2.0 | 992 | 16.0 | 0.52 | 0.40 | 3.4 |
| C18 100A | 1.0 | 472 | 20.0 | 0.53 | 0.41 | 4.3 |
|  | 0.5 | 200 | 16.7 | 0.53 | 0.41 | 3.6 |
| 8-5R | 2.0 | NA | NA | NA | NA | NA |
|  | 1.0 | 3250 | 24.7 | 0.52 | 0.48 | 6.1 |
|  | 0.5 | 1570 | 23.8 | 0.53 | 0.48 | 6.0 |
| 8-4R | 2.0 | 4700 | 20.8 | 0.50 | 0.38 | 3.9 |
|  | 1.0 | 2400 | 24.3 | 0.50 | 0.38 | 4.6 |
|  | 0.5 | 1130 | 26.6 | 0.50 | 0.38 | 4.1 |

(1) N and k' are determined using the benzaldehyde peak, alpha using benzaldehyde and benzene peaks.

Although preferred embodiments of this invention have been discussed herein, those skilled in the art will appreciate that changes and modifications may be made without departing from the spirit of the invention, as defined in and limited only by the scope of the appended claims.

We claim:

1. A method for production of a porous, high specific surface area silica gel having a narrow pore diameter distribution comprising:
   (a) mixing a solution of silicon tetrafluoride and a water-soluble, non-aqueous solvent with at least a stoichiometric quantity of water to form a reactant mixture and to hydrolyze the silicon tetrafluoride to silica;
   (b) permitting the silica to gel;
   (c) separately recovering the silica gel from the remainder of the reactant mixture; and
   (d) washing said silica gel with a washing medium comprising water until the pH of the gel is at least above about 3.

2. The method of claim 1 wherein the concentration of the silicon tetrafluoride solution is between about 5 and 40 wt percent.

3. The method of claim 1 wherein the solvent is a $C_1$-$C_5$ aliphatic alcohol.

4. The method of claim 3 wherein the alcohol is a $C_1$-$C_3$ aliphatic alcohol.

5. The method of claim 1 wherein the mass ratio of water to silicon tetrafluoride is at least about 2:1.

6. The method of claim 5 wherein the mass ratio of water to silicon tetrafluoride is between about 4:1 and 10:1.

7. The method of claim 1 further comprising adding to the water of step (a) a quantity of ammonia sufficient to produce in the water an ammonium hydroxide concentration of less than about 1.0 wt percent.

8. The method of claim 1 wherein the washing medium is water having up to about 0.010 wt percent ammonium hydroxide.

9. A method for production of a porous, high specific surface area silica gel having a narrow pore diameter distribution comprising:
   (a) mixing a solution of silicon tetrafluoride and a solvent selected from the group consisting of $C_1$-$C_3$ aliphatic alcohols with a quantity of water sufficient to form a reactant mixture having a mass ratio of water to silicon tetrafluoride of between about 4:1 and 10:1 and to hydrolyze the silicon tetrafluoride to silica;
   (b) permitting the silica to gel;
   (c) separately recovering the silica gel from the remainder of the reactant mixture; and
   (d) washing said silica gel in a washing medium comprising water until the pH of the gel is at least above about 3.

10. A method for producing silica gel suitable for use in high pressure liquid chromatography comprising:
   (a) mixing a solution of silicon tetrafluoride and a solvent selected from the group consisting of $C_1$-$C_3$ aliphatic alcohols with a quantity of water sufficient to form a reactant mixture having a mass ratio of water to silicon tetrafluoride of between about 4:1 and 10:1 and to hydrolyze the silicon tetrafluoride to silica;
   (b) permitting the silica to gel;
   (c) separately recovering the silica gel from the remainder of the reactant mixture;
   (d) washing said silica gel in a washing medium comprising water until the pH of the gel is at least above about 3; and
   (e) drying said washed gel to obtain dry gel having essentially one form of silanol moiety.

11. A method for production of a porous, high specific surface area silica gel having a narrow pore diameter distribution comprising:
   (a) mixing a solution of silicon tetrachloride and a water-soluble, non-aqueous solvent with at least a stoichiometric quantity of water containing fluoride ion to form a reactant mixture and to hydrolyze the silicon tetrachloride to silica;
   (b) permitting the silica to gel;
   (c) aging the gel for about 4 hours;
   (d) separately recovering the silica gel from the remainder of the reactant mixture; and
   (e) washing said silica gel with a washing medium comprising until the pH of the gel is at least above about 3.

12. The method of claim 11 wherein the concentration of the silicon tetrachloride solution is between about 5 and 40 wt percent.

13. The method of claim 11 wherein the solvent is $C_1$-$C_5$ aliphatic alcohol.

14. The method of claim 13 wherein the alcohol is a $C_1$-$C_3$ aliphatic alcohol.

15. The method of claim 11 wherein the molar ratio of water to silicon tetrachloride is at least about 5:1.

16. The method of claim 15 wherein the molar ratio of water to silicon tetrachloride is between about 5:1 and 30:1.

17. The method of claim 11 wherein the fluoride ion concentration of step (a) is between about 1 and 6 wt percent.

18. The method of claim 11 wherein the washing medium is water having up to about 0.010 wt percent ammonium hydroxide.

19. A method for production of a porous, high specific surface area silica gel having a narrow pore diameter distribution comprising:
   (a) mixing a solution of silicon tetrachloride and a solvent selected from the group consisting of $C_1$-$C_3$ aliphatic alcohols with a quantity of water containing up to 6 wt percent fluoride ion, said quantity of fluoride ion-containing water sufficient to form a reactant mixture having molar ratio of water to silicon tetrachloride of between about 5:1 and 30:1 and to hydrolyze the silicon tetrachloride to silica;
   (b) permitting the silica to gel;
   (c) aging the gel for about 4 hours at a temperature between about 20° and 80° C.;
   (d) separately recovering the silica gel from the remainder of the reactant mixture; and
   (e) washing said silica gel with a washing medium comprising water until the pH of the gel is at least above about 3.

20. A method for producing silica gel suitable for use in high pressure liquid chromatography comprising:
   (a) mixing a solution of silicon tetrachloride and a water-soluble, non-aqueous solvent with at least a stoichiometric quantity of water containing fluoride ion to form a reactant mixture and to hydrolyze the silicon tetrachloride to silica;
   (b) permitting the silica to gel;
   (c) aging the gel for about 4 hours;
   (d) separately recovering the silica gel from the remainder of the reactant mixture;
   (e) washing said silica gel with a washing medium comprising water until the pH of the gel is at least above about 3; and
   (f) drying said washed gel to obtain dry gel having essentially one form of silanol moiety.

* * * * *

UNITED STATES PATENT AND TRADEMARK OFFICE
CERTIFICATE OF CORRECTION

PATENT NO. : 5,158,758

DATED : October 27, 1992

INVENTOR(S) : P.C. Chieng et al

It is certified that error appears in the above-identified patent and that said Letters Patent is hereby corrected as shown below:

Column 10, Table 2, under the heading Six-point, line 2, "444" should read --555--

Column 11, Table 3, under the heading 2A, last line, "66.88" should read --66.68--

Column 23, claim 11, line 54, Step e, following the word comprising, insert the word --water--

Signed and Sealed this

Seventh Day of December, 1993

Attest:

BRUCE LEHMAN

*Attesting Officer*       *Commissioner of Patents and Trademarks*